United States Patent [19] [11] Patent Number: 5,884,163
Hardouin [45] Date of Patent: Mar. 16, 1999

[54] AUTOMATIC LEARNING OF WIRELESS COVERAGE

[75] Inventor: Larry J. Hardouin, Westminster, Colo.

[73] Assignee: Lucent Technologies Inc., Murray Hill, N.J.

[21] Appl. No.: 770,928

[22] Filed: Dec. 23, 1996

[51] Int. Cl.[6] .................................................. H04Q 7/22
[52] U.S. Cl. ......................................... 455/423; 455/456
[58] Field of Search .................................. 455/423, 456; 342/450, 457

[56] References Cited

U.S. PATENT DOCUMENTS 5,602,903  2/1997  Leblanc et al. .

*Primary Examiner*—William Cumming
*Attorney, Agent, or Firm*—John C. Moran

[57] ABSTRACT

Using feedback by a system controller from wireless handsets to determine sub-areas which do not have coverage within a wireless telecommunication system. A system controller is responsive to the inability of a wireless handset to handoff to a base station, to record this fact, and requests that the wireless handset continue to monitor for a base station with sufficient transmission power. Note, the active call is lost when the handoff did not occur. When the wireless handset finds a base station that has sufficient transmission power on which to register, the wireless handset registers on this base station and sends a message to the system controller advising it of the failed handoff and the duration that occurred before a new base station was found. The system controller is responsive to this information to maintain a table for each base station from which a successful handoff could not be performed due to the lack of coverage. The system controller also instructs inactive wireless handsets to measure the transmission strength of base stations as the wireless handset moves from location to location. The wireless handset is responsive to the inability to detect a base station of sufficient strength to report this fact to the system controller once the wireless handset comes in contact with a base station that it can register on. The system controller records this information in the same table as is utilized for failed handoffs.

12 Claims, 10 Drawing Sheets

FIG. 3

| CURRENT BASE STATION NUMBER | NEW REGISTERED BASE STATION NUMBER | NO. OF FAILURES | | AVERAGE DURATION OF COVERAGE LOSS—HANDOFF | AVERAGE DURATION OF COVERAGE LOSS—INACTIVE |
| --- | --- | --- | --- | --- | --- |
| | | HANDOFF | INACTIVE | | |
| 110 | 109 | 8 | NA | 4 | |
| 110 | 109 | NA | NA | | 1 |
| 110 | 107 | 18 | NA | 8 | |
| 110 | 107 | NA | NA | | 4 |
| | | | | | |
| | | | | | |

301, 302

TABLE 304

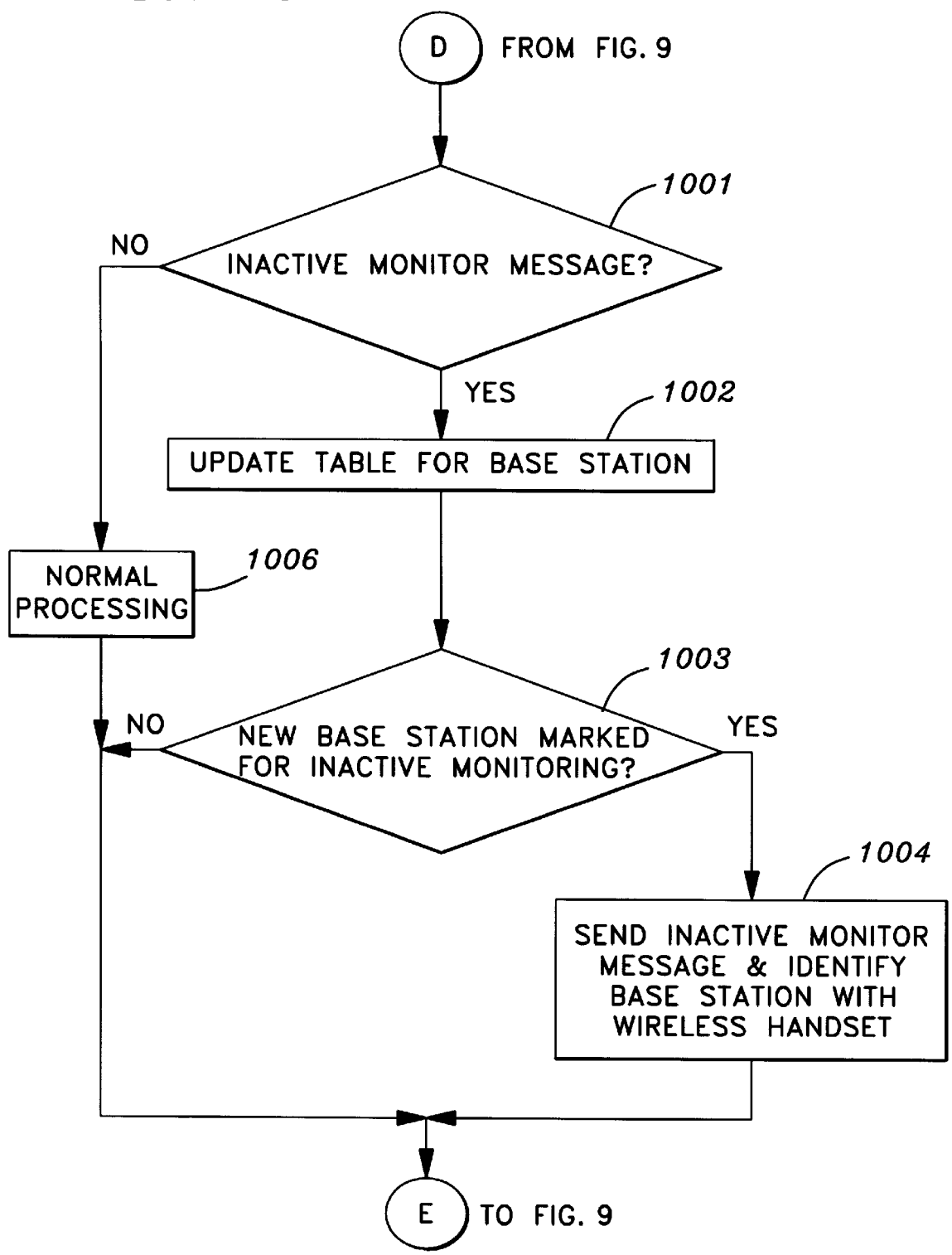

AUTOMATIC LEARNING OF WIRELESS COVERAGE

TECHNICAL FIELD

This invention relates to wireless telecommunication switching, and in particular, to the detection of sub-areas within a wireless telecommunication system from which it is not possible to contact a base station.

BACKGROUND OF THE INVENTION

During the installation of prior art wireless communication systems, several tools can be used to predict the correct placement of cells with each cell having a base station. After the system is installed, traffic measurements can show cells with high call rates. These cells may need additional channels. The tools do not show sub-areas within a cell where no service is provided. With prior art installation techniques, it is common that after installation for a technician using a hand-held instrument to roam the entire coverage areas to verify completeness of coverage. However, for a large wireless communication system, this is not completely feasible or is extremely difficult. An additional problem is that after installation, there may be sub-areas within a large coverage area which are obscured by barriers or simply cannot be reached due to the distance from the nearest cell. The service provider is then left waiting for customer complaints before knowing the areas to check. Even if the original installation is perfect, the expansion of the coverage area or the addition of walls or machinery to a coverage area can create these sub-areas in which there is no coverage.

SUMMARY OF THE INVENTION

The foregoing problems are solved, and a technical advance is achieved by an apparatus and method in which a system controller uses feedback from wireless handsets to determine sub-areas which do not have coverage within a wireless telecommunication system. Advantageously, a system controller is responsive to the inability of a wireless handset to handoff to a base station, to record this fact, and requests that the wireless handset continue to monitor for a base station with sufficient transmission power. Note, the active call is lost when the handoff could not occur. When the wireless handset finds a base station that has sufficient transmission power on which to register, the wireless handset registers on this base station and sends a message to the system controller advising it of the failed handoff and the duration that occurred before a new base station was found. The system controller is responsive to this information to maintain a table for each base station from which a successful handoff could not be performed due to the lack of coverage.

Advantageously, the system controller also instructs inactive wireless handsets to measure the transmission strength of base stations as the wireless handset moves from location to location. The wireless handset is responsive to the inability to detect a base station of sufficient strength to report this fact to the system controller once the wireless handset comes in contact with a base station that it can register on. The system controller records this information in the same table as is utilized for failed handoffs.

Other and further aspects of the present invention will become apparent during the course of the following description and by reference to the accompanying drawing.

BRIEF DESCRIPTION OF THE DRAWING

FIG. 3 illustrates a table maintained by the system controller;

FIGS. 9 and 10 illustrate the steps performed by a system controller utilizing the invention.

DETAILED DESCRIPTION

Figure 1:
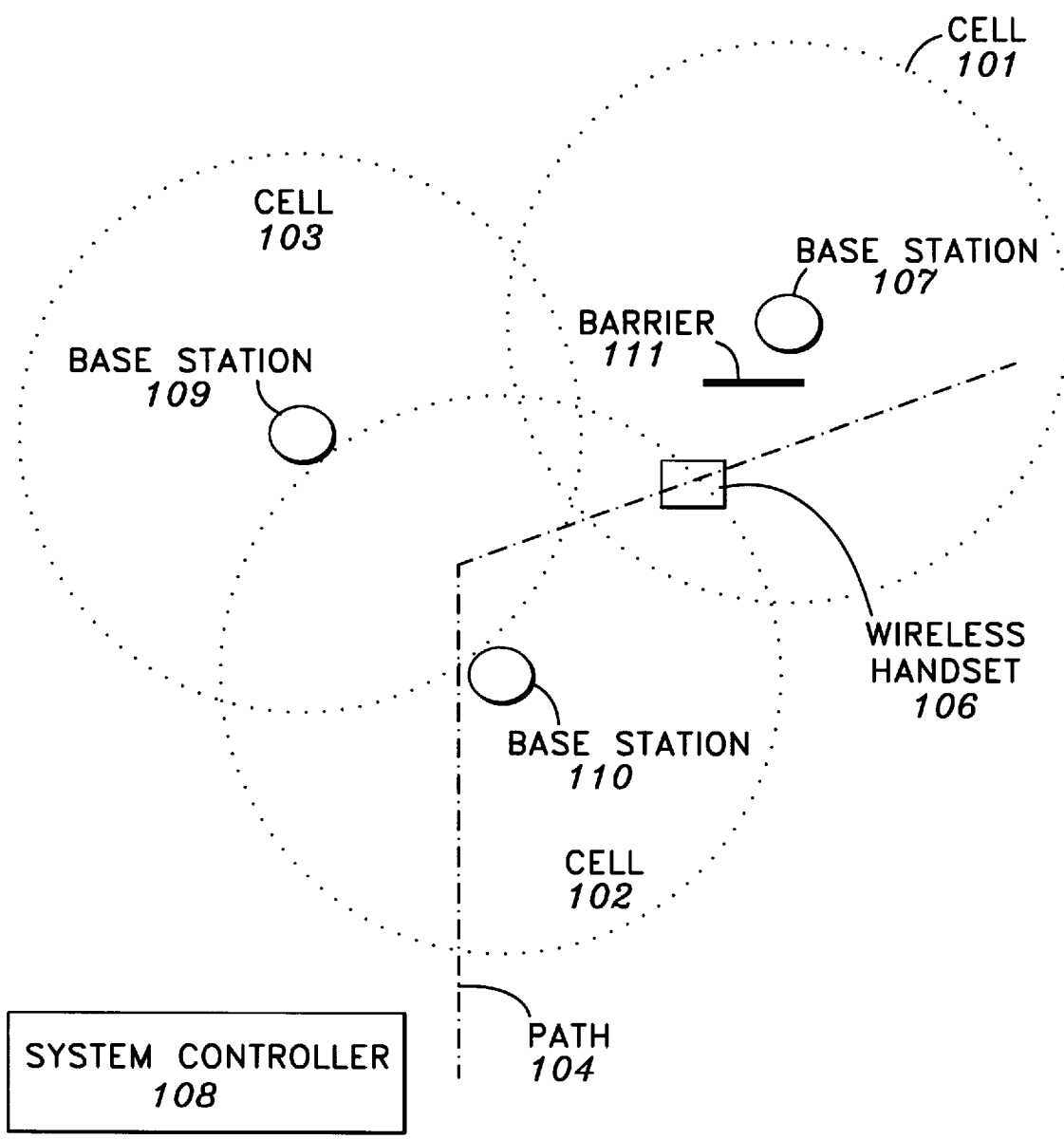
FIG. 1 illustrates a wireless telecommunication switching system embodying the inventive concept.

FIG. 1 illustrates a wireless telecommunication system having a plurality of wireless cell sites (also referred to as cells) which are cells 101–103. Each cell has one base station assumed to be located in the center of the cell such as base station 107 for cell 101. The plurality of cells are providing service for wireless handsets such as wireless handset 106. The cells illustrated in FIG. 1 are under control of system controller 118. The geographical area covered by the cells is illustrated as being a circle for each cell; however, one skilled in the art would immediately recognize that the geographical area covered by each cell could be of different configuration. System controller 108 controls the operations of the cells by controlling the base stations via communication links not illustrated in FIG. 1.

To understand the operation of the wireless communication system of FIG. 1, in accordance with the invention, consider the following example. Wireless handset 106 is preceding along path 104. When wireless handset 106 reaches the position illustrated in FIG. 1, wireless handset 106 must perform a handoff operation under control of system controller 108. Normally in this position, wireless handset 106 would handoff to base station 107 of cell 101. However, because of barrier 111, wireless handset 106 cannot establish adequate radio communication with base station 107. Consequently, the active call, on which wireless handset 106 is presently engaged, must be dropped since wireless handset 106 is not in range of base station 109 of cell 103. System controller 108 records the fact that wireless handset 106 was unable to perform the handoff and instructs wireless handset 106 to monitor when it detects a base station of adequate strength on which it can register. In addition, system controller 108 requests that all base stations monitor to determine if they can detect any signal from wireless handset 106 even if this signal is not of adequate transmission power to allow a handoff.

Figure 2:
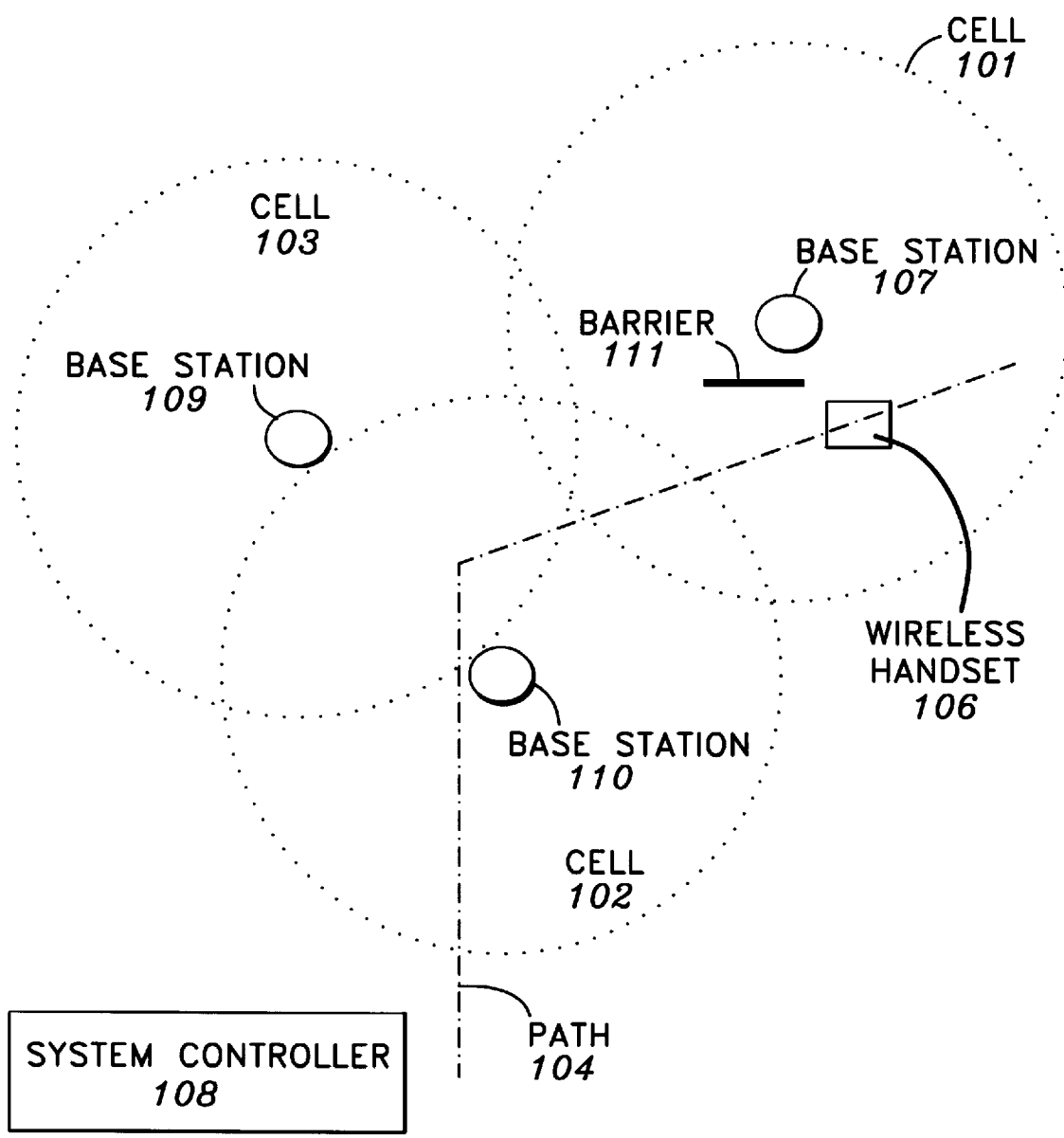
FIG. 2 illustrates the wireless telecommunication switching system of FIG. 1 with a wireless handset in a different physical location.

When wireless handset 106 reaches the position illustrated in FIG. 2, it is able to establish radio communication with base station 107 since barrier 111 is no longer in the way. Wireless handset 106 registers on base station 107 and sends a message to system controller 108 informing system controller 108 of the identity of wireless handset 106 and the fact that a handoff from cell 102 had failed a certain amount of time ago. The amount of time is maintained by wireless handset 106. System controller 108 is responsive to this information to update the table 304 of FIG. 3 for cell 102 by inserting line 301.

Table 304 of FIG. 3 is utilized at a later point in time by the administrator of the wireless telecommunication system to detect where potential sub-areas may exist where coverage is not possible. The system administrator then requests that system controller 108 requests that wireless handsets, while in cell 102 and not active on a call, monitor the ability to detect base station 107. If a wireless handset while in this inactive state determines that it cannot detect base station 107, the wireless handset informs system controller 108 of this fact when it is able to re-establish contact with a base station. System controller 108 is responsive to this information to insert line 302 into table 304 of FIG. 3 if the base station is base station 107 of cell 101. One skilled in the art could readily envision that system controller 108 could be programmed to determine when inactive wireless handsets should monitor a base station.

Figure 4:
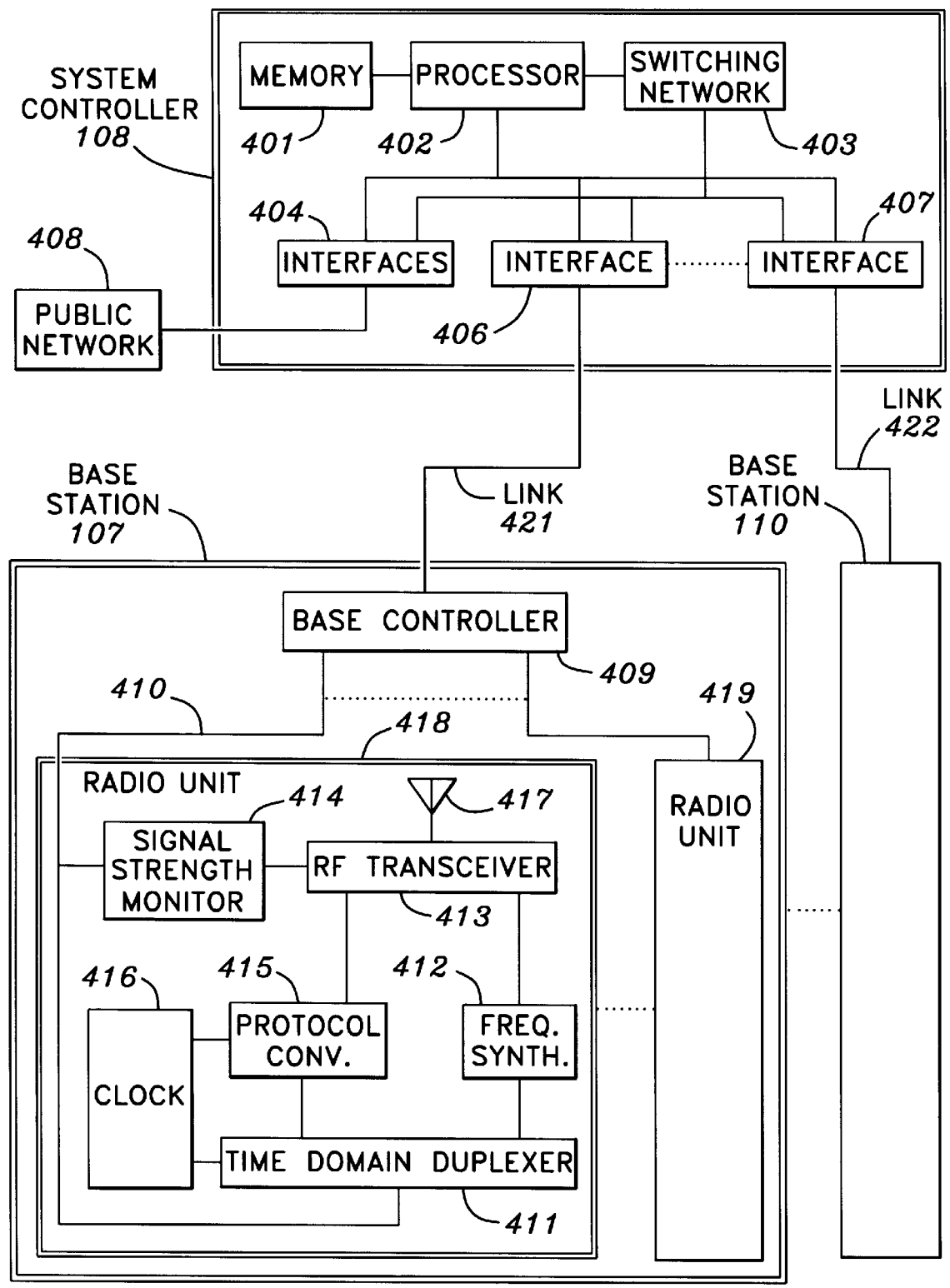
FIG. 4 illustrates, in block diagram form, in greater detail, the wireless telecommunication system of FIGS. 1 and 2.

FIG. 4 illustrates, in block diagram form, the wireless telecommunication system illustrated in FIGS. 1–3. System controller 108 is under the control of processor 402 which executes programs and utilizes data stored in memory 401. For example, memory 401 stores table 304. System controller 108 interfaces to public network 408 via interfaces 404. System controller 108 is interconnected to base stations 107, 109, and 110 via links 421–422 which terminate on interfaces 406–407. The switching of audio and data received via interfaces 406–407 is performed by switching network 403 under control of processor 402. Base station 107 illustrates in greater detail the composition of a base station. Each base station comprises a plurality of radio units 418–419 that are under the control of base controller 409. Base controller 409 is responsive to the message requesting that a wireless handset's transmission signal strength be interrogated to adjust the frequency of RF transceiver 413 to the channel used by the wireless handset by controlling frequency synthesizer 412 via time domain duplexer 411 and bus 410. Signal strength monitor 414 reports the relative signal strength of the wireless handset to base controller 409 via bus 410.

Figure 5:
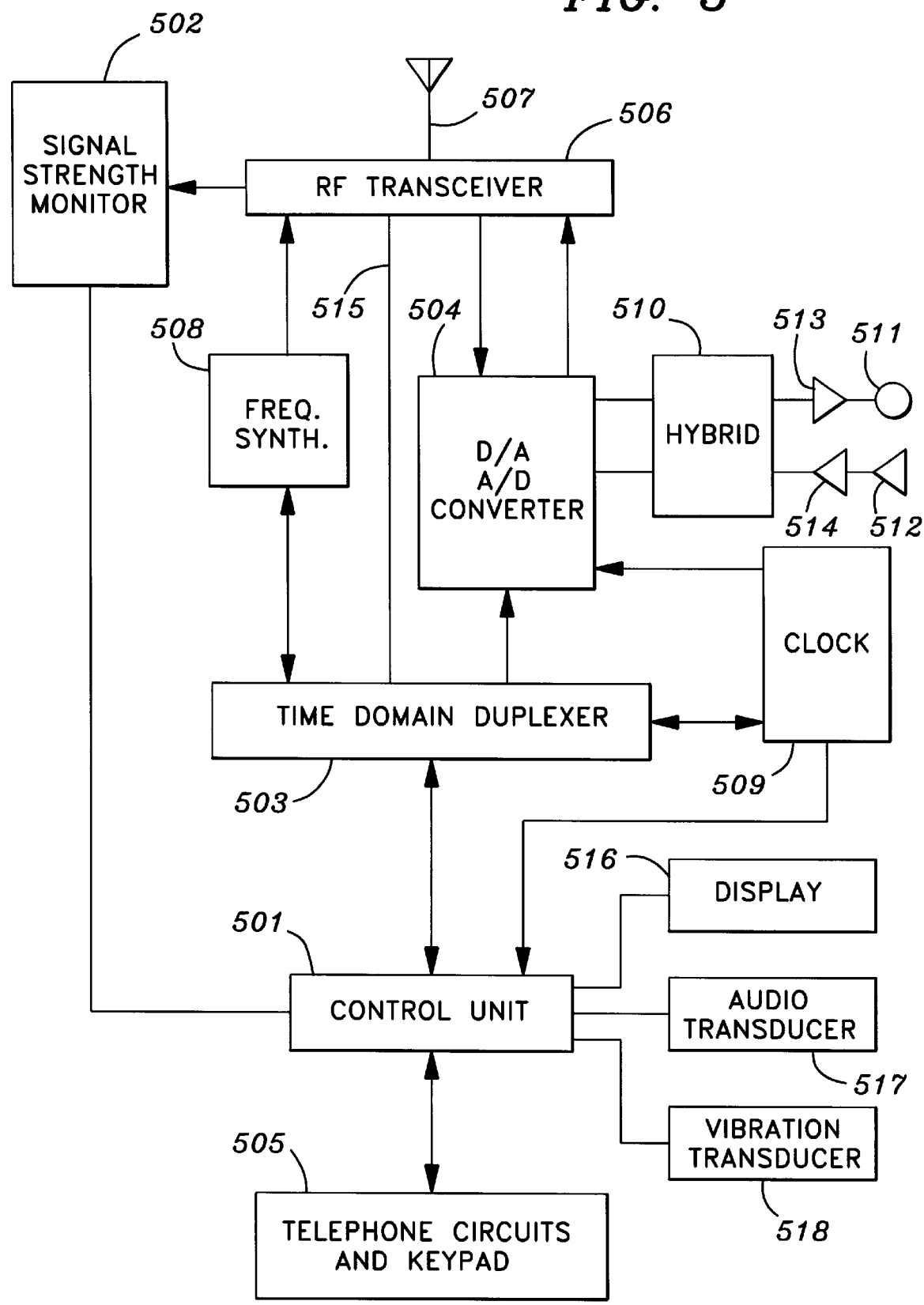
FIG. 5 illustrates a wireless handset in block diagram form.

Wireless handset 117 is illustrated in FIG. 5. Wireless handset 117 is implementing a wireless protocol that allows wireless handset 117 to communicate facility messages with system controller 108 via the base stations in the cells. One wireless protocol that can be used is the Japanese PHS protocol as set forth in "User-Network Interface and Inter-Network Interface Standards for PHS", the Telecommunication Technology Committee, 1995, and "Personal Handy Phone System RCR Standard", Version 1, RCR STD-28, Dec. 20, 1993. The message set of the PHS protocol is similar to the ISDN message set. In the present embodiment, only the signal protocol of the PHS protocol is used and not the handover method of the PHS protocol. Facility messages are used by control unit 501 of wireless handset 117 and system controller 108 to communicate messages used in implementing the present invention. When control unit 501 is instructed by system controller 108 to monitor for a base station, control unit 501 utilizes signal strength monitor 502 to monitor for base stations. When a base station is detected, control unit 501 utilizes a facility message to report this information to system controller 108. The operations of elements 503–518 are well known in the art.

Figure 6:
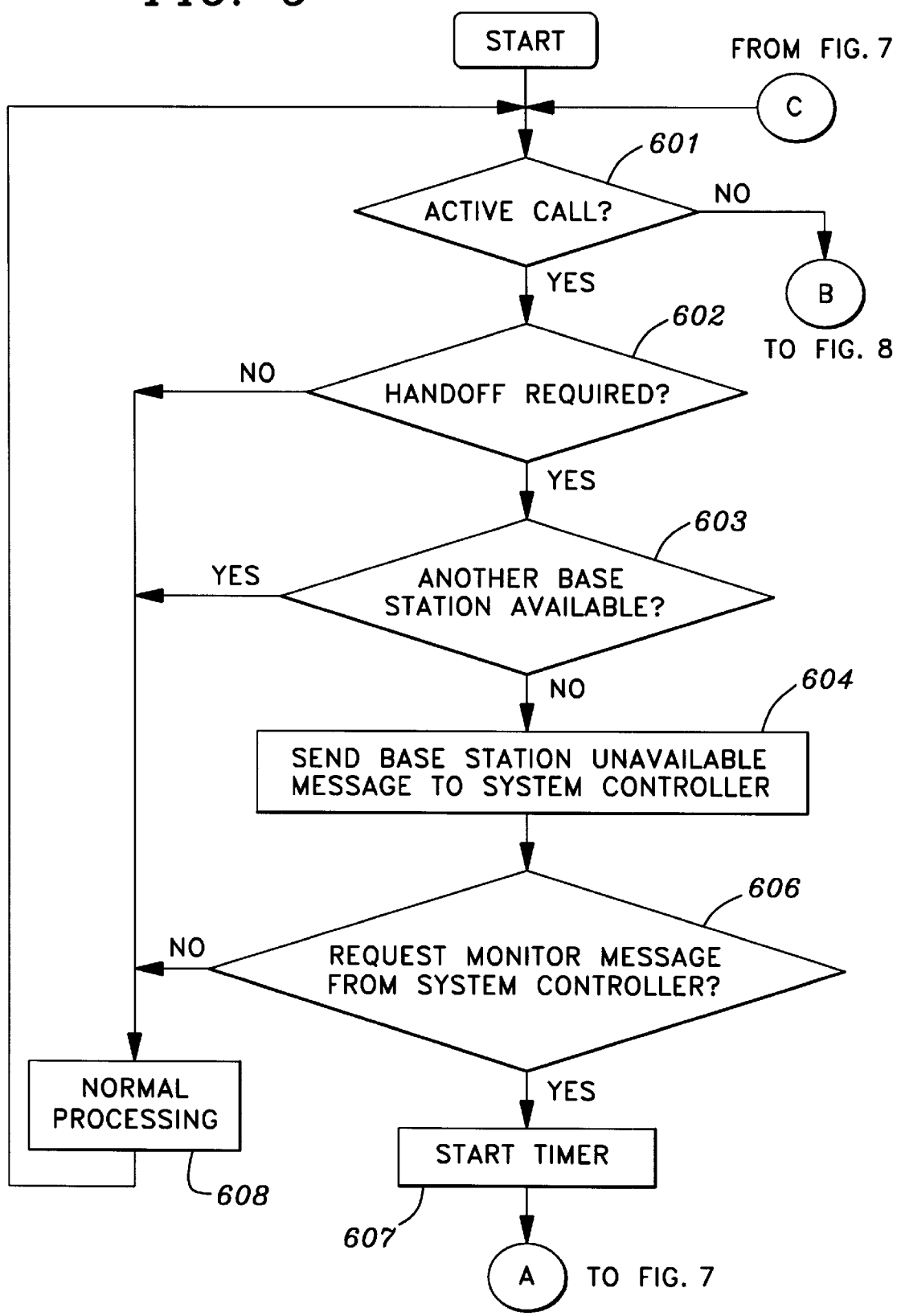
FIGS. 6–8 illustrate the steps performed by wireless handset utilizing the invention.
Figure 7:
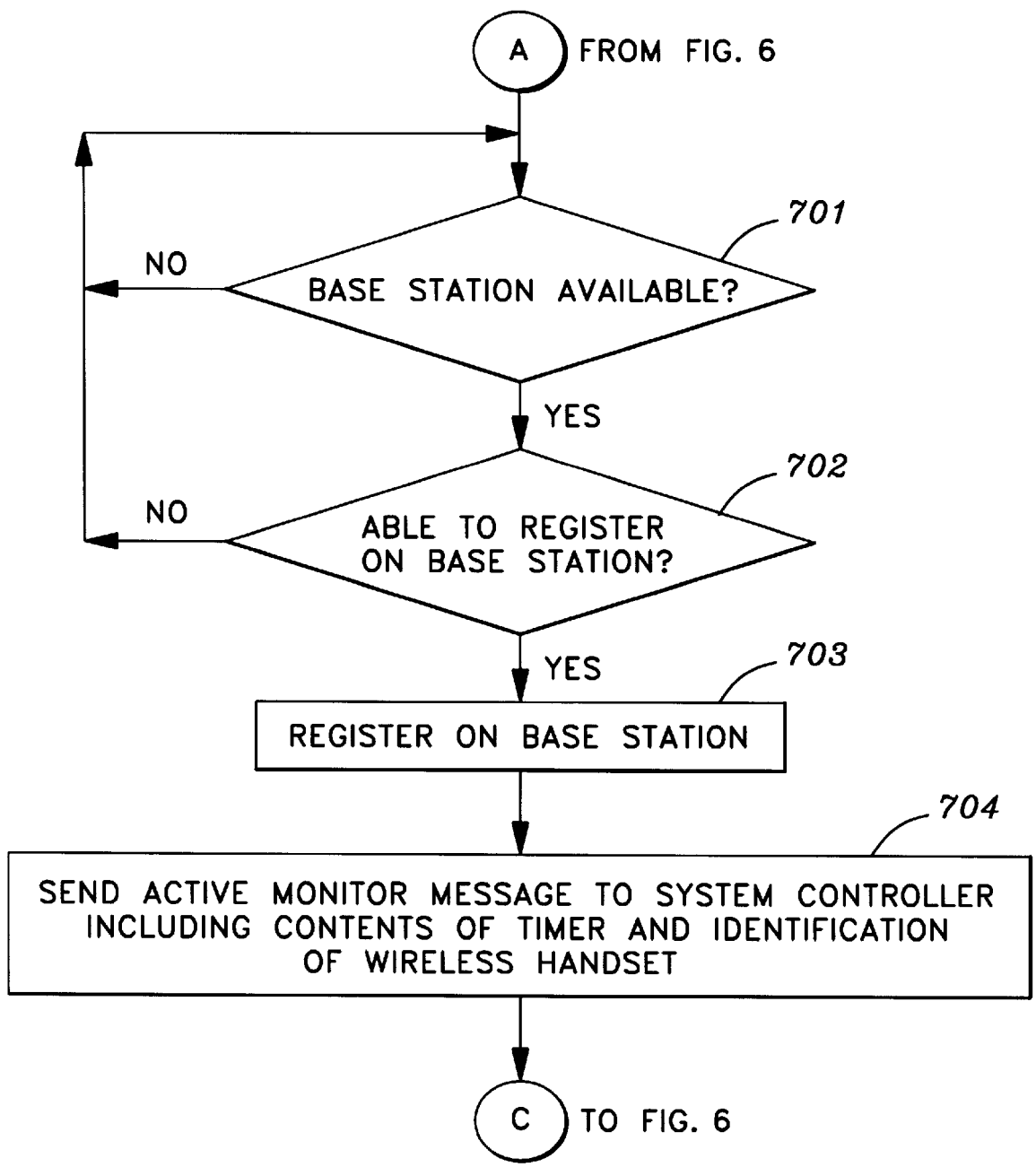
Figure 8:
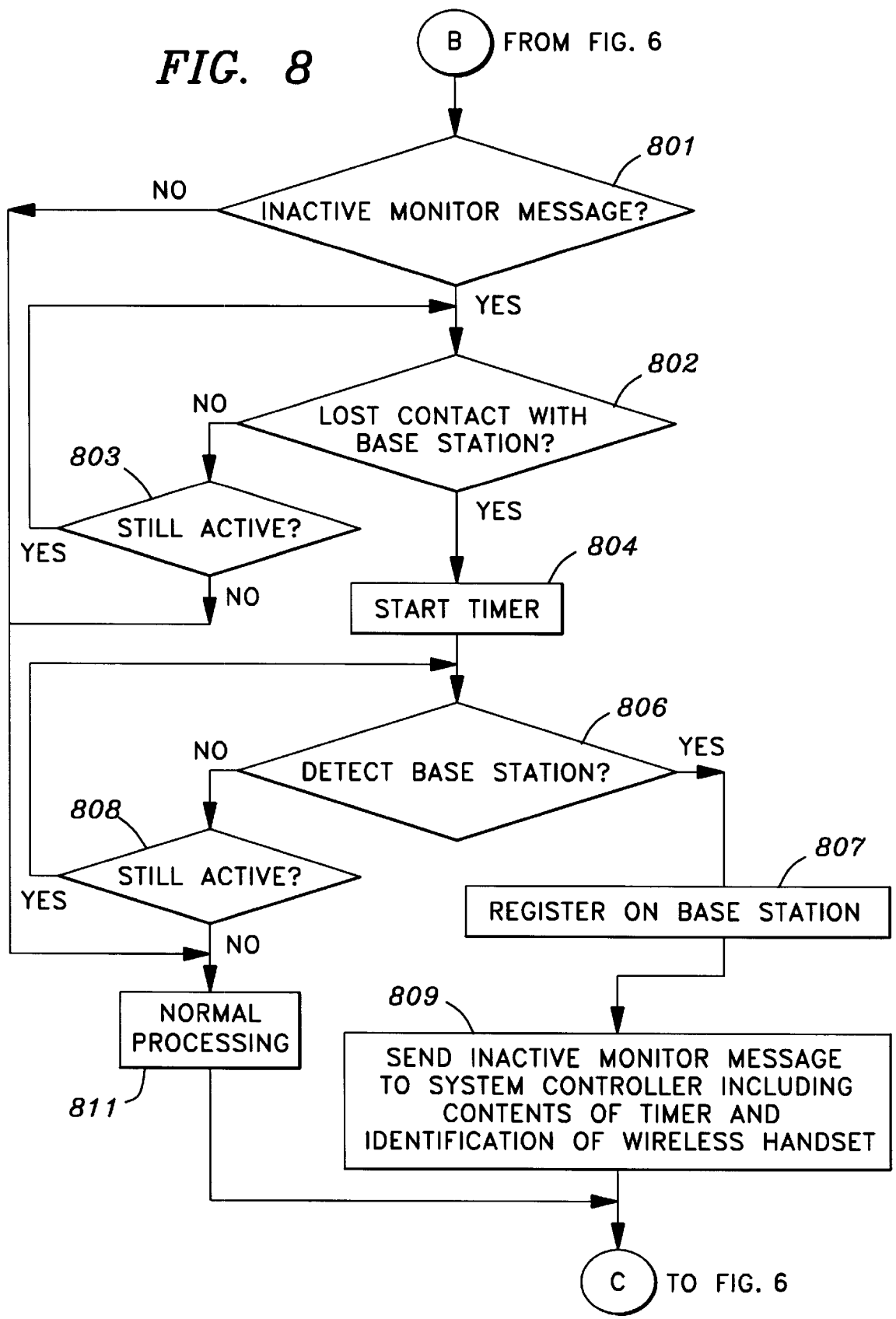

FIGS. 6–8 illustrate the steps performed by control unit 501 of a wireless handset of FIG. 5. Decision block 601 of FIG. 6 determines if the wireless handset is on an active call. If the answer is yes, decision block 602 determines if a handoff is required. If the answer is no, control is transferred to block 608 for normal processing. After normal processing, block 608 returns control to decision block 601. If the answer in decision block 602 is yes, decision block 603 determines if another base station is available for the handoff. If a handoff is possible, control is transferred to block 608 so that this handoff can be accomplished in a normal manner. If the answer in decision block 603 is no, block 604 sends a "base station unavailable" message to system controller 108 before transferring control to decision block 606. Decision block 606 then waits for a "request monitor" message from system controller 108. If this message is not received, it simply means that system controller 108 is not requesting the monitoring, and control is transferred to block 608. If the answer in decision block 606 is yes, block 607 starts an internal timer of control unit 501 before transferring control to decision block 701 of FIG. 7.

Decision block 701 monitors for when a base station becomes available so that the wireless handset can register and transmit a "active monitor" message to system controller 108 informing it of the amount of time that has elapsed since the wireless handset was able to establish radio communication with a base station. When a base station does become available, control is transferred from decision block 701 to decision block 702. Decision block 702 determines if it is possible to register on the new base station. If the answer is no, control is transferred back to decision block 701. If the answer in decision block 702 is yes, control is transferred to block 703 which registers on the base station before transferring control to block 704. Block 704 sends the "active monitor" message to system controller 108. This message includes the contents of the timer and the identification of the wireless handset. After execution of block 704, control is transferred back to decision block 601 of FIG. 6.

Returning to decision block 601 of FIG. 6, if the wireless handset is not presently engaged in an active call, control is transferred to decision block 801 of FIG. 8. Decision block 801 determines if an "inactive monitor" message has been received from system controller 108. If the answer is no, block 811 does normal processing before returning control to decision block 601 of FIG. 6. If the answer is yes in decision block 801, decision block 802 determines when the wireless handset loses contact with the base station. While contact is still present, control is transferred to decision block 803 which determines if the wireless handset is still in the inactive state or is engaged in an active call. If the answer in decision block 803 is yes, control is transferred back to decision block 802 so that the occurrence of no coverage can be detected. If the answer in decision block 803 is no, control is transferred to block 811 for normal processing.

Returning to decision block 802, if the answer is yes indicating the lack of coverage, block 804 starts an internal timer and transfers control to decision block 806. Decision block 806 determines when a base station is detected. If no base station is detected, decision block 808 determines if the wireless handset is still in the inactive state. If the answer is yes in decision block 808, control is transferred back to decision block 806. If the answer in decision block 808 is no, block 811 does normal processing.

Returning to decision block 806, if a base station is detected, control is transferred to block 807 which registers on this base station. After execution of block 807, block 809 sends an "inactive monitor" message to system controller 108. This message includes the contents of the timer and the identification of the wireless handset. After execution of block 809, control is transferred back to decision block 601 of FIG. 6.

Figure 9:
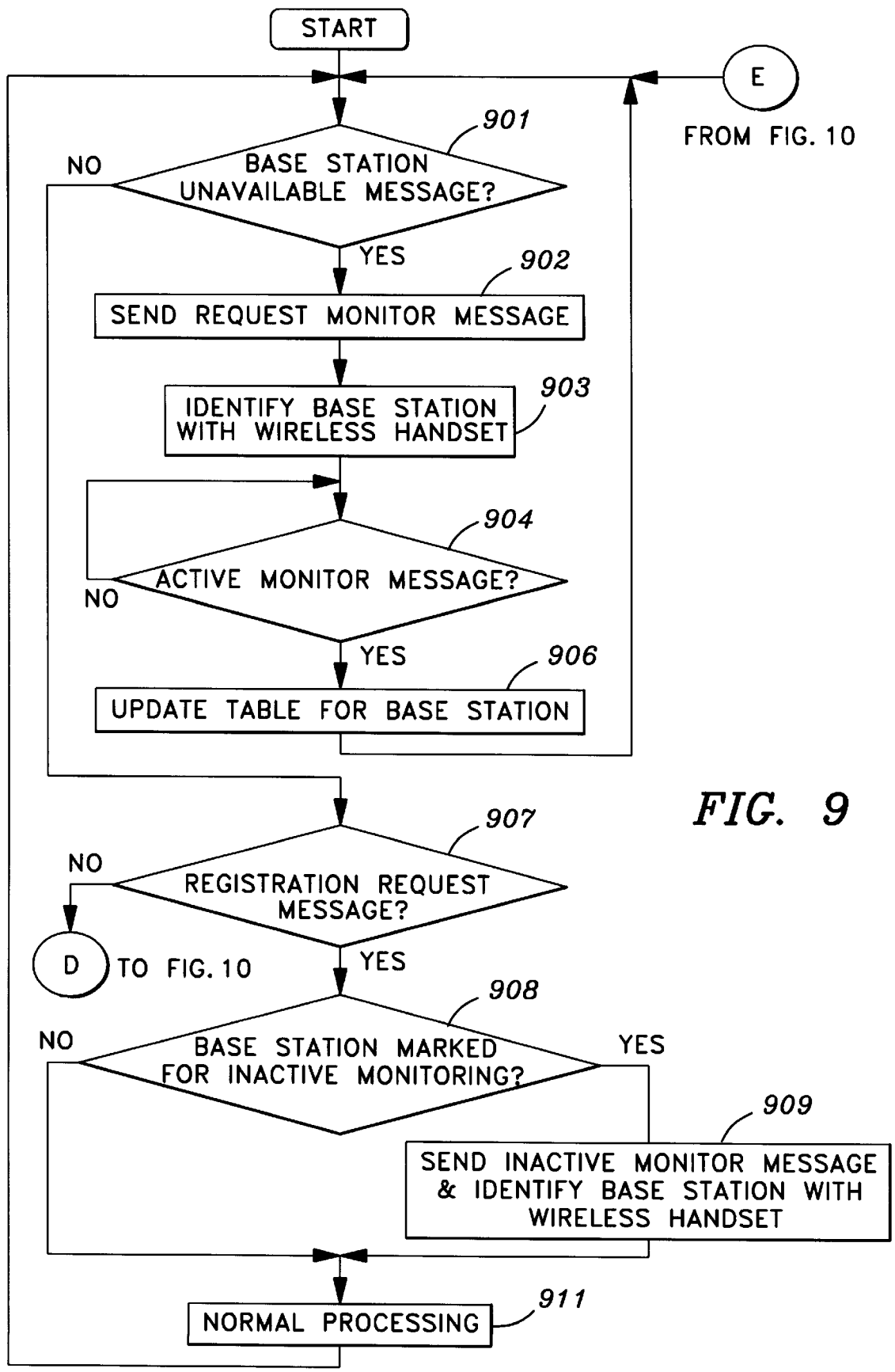

FIGS. 9 and 10 illustrate the operations performed by system controller 108. Decision block 901 determines if a "base station unavailable" message has been received from a wireless handset. If the answer is yes, control is transferred to block 902 which sends a "request monitor" message to the wireless handset. Then, block 903 identifies the base station with the wireless handset and transfers control to decision block 904. Decision block 904 waits until an "active monitor" message is received from the wireless handset and transfers control to block 906. Block 906 updates table 304 illustrated in FIG. 3 with the time information received from the wireless handset before transferring control back to decision block 901.

Returning to decision block 901, if the answer is no, control is transferred to decision block 907 which determines if a "registration request" message been received from a wireless handset. If the answer is yes, decision block 908 determines if the base station on which the wireless handset is attempting to register has been marked for inactive monitoring. If the answer is yes in decision block 908, block 909 sends an "inactive monitor" message to the wireless handset and identifies the base station with the wireless handset before transferring control to block 911. The latter block will perform the normal registration operations.

Returning to decision block 907, if the answer is no, control is transferred to decision block 1001 of FIG. 9. Decision block 1001 determines if an "inactive monitor" message has been received from the wireless handset. If the answer is no, block 1006 does normal processing before returning control back to decision block 901 of FIG. 9. If the answer in decision block 1001 is yes, block 1002 updates table 304 of FIG. 3 for the base station before transferring control to decision block 1003. Decision block 1003 determines if the new base station on which the wireless handset has just registered is also marked for inactive monitoring. If the answer is yes, control is transferred to block 1004 which sends an "inactive monitor" message to the wireless handset and identifies the base station with the wireless handset before transferring control back to decision block 901 of FIG. 9.

It is to be understood that the above-described embodiments are merely illustrative of the principles of the invention and that other arrangements may be devised by those skilled in the art without departing from the spirit and scope of the invention.

The invention claimed is:

1. A method for detecting lack of coverage by a wireless switching system that is providing wireless telecommunication service to a plurality of wireless handsets via a plurality of base stations under control of a system controller, comprising the steps of:

detecting the inability of one of the plurality of wireless handsets to perform a handoff from one of the plurality of base stations;

monitoring by the one of the plurality of wireless handsets for any available one of the plurality of base stations with which the one of the plurality of wireless handsets can establish communication for registration;

registering on a first available one of the plurality of base stations by the one of the plurality of wireless handsets upon communication being established with the first available one of the plurality of base stations;

transmitting a message by the one of the plurality of wireless handsets to the system controller identifying the one of the plurality of wireless handsets and that the handoff had failed; and recording an occurrence of a failed handoff from the one of the plurality of base stations by the one of the plurality of wireless handsets.

2. The method of claim 1 wherein the step of recording comprises storing with the recorded occurrence an identity of the first available one of the plurality of base stations by the system controller.

3. The method of claim 2 further comprises the step of determining an amount of time that occurred between the failed handoff and registration on the first available one of the plurality of base stations;

the step of transmitting comprises the step of including the amount of time in the message; and the step of storing further stores the amount of time with the recorded occurrence.

4. The method of claim 3 further comprises the steps of instructing by the system controller a set of inactive ones of the plurality of wireless handsets that can establish communication with the one of the plurality of base stations to detect when communication is lost with the one of the plurality of base stations;

detecting by each wireless handset of the set the loss of communication with the one of the plurality of base stations;

monitoring by each wireless handset of the set for any available one of the plurality of base stations on which to register;

registering on a second available one of the plurality of base stations by each wireless handset of the set upon communication being established with the second available one of the plurality of base stations;

transmitting another message by each wireless handset of the set to the system controller identifying the one of the plurality of base stations and that communication had been lost; and recording an occurrence of the lost communication from the one of the plurality of base stations.

5. The method of claim 4 wherein the step of recording the occurrence of the lost communication comprises storing with the recorded occurrence of the lost communication an identity of the second available one of the plurality of base stations by the system controller.

6. The method of claim 5 further comprises the step of determining a second amount of time that occurred between the loss of communication and registration on the second available one of the plurality of base stations;

the step of transmitting the other message comprises the step of including the second amount of time in the other message; and the step of storing further stores the second amount of time with the recorded occurrence of the lost communication.

7. A wireless switching system for detecting lack of coverage while providing wireless telecommunication service to a plurality of wireless handsets via a plurality of base stations under control of a system controller, comprising:

means for detecting the inability of one of the plurality of wireless handsets to perform a handoff from one of the plurality of base stations;

means for monitoring by the one of the plurality of wireless handsets for any available one of the plurality of base stations with which the one of the plurality of wireless handsets can establish communication for registration;

means for registering on a first available one of the plurality of base stations by the one of the plurality of wireless handsets upon communication being established with the first available one of the plurality of base stations;

means for transmitting a message by the one of the plurality of wireless handsets to the system controller identifying the one of the plurality of wireless handsets and that the handoff had failed; and means for recording an occurrence of a failed handoff from the one of the plurality of base stations by the one of the plurality of wireless handsets.

8. The wireless switching system of claim 7 wherein the means for recording comprises storing with the recorded occurrence an identity of the first available one of the plurality of base stations by the system controller.

9. The wireless switching system of claim 8 further comprises means for determining an amount of time that occurred between the failed handoff and registration on the first available one of the plurality of base stations;

the means for transmitting comprises means for including the amount of time in the message; and the means for storing further stores the amount of time with the recorded occurrence.

10. The wireless switching system of claim 9 further comprises means for instructing by the system controller a set of inactive ones of the plurality of wireless handsets that can establish communication with the one of the plurality of base stations to detect when communication is lost with the one of the plurality of base stations;

means for detecting by each wireless handset of the set the loss of communication with the one of the plurality of base stations;

means for monitoring by each wireless handset of the set for any available one of the plurality of base stations on which to register;

means for registering on a second available one of the plurality of base stations by each wireless handset of the set upon communication being established with the second available one of the plurality of base stations;

means for transmitting another message by each wireless handset of the set to the system controller identifying the one of the plurality of base stations and that communication had been lost; and means for recording an occurrence of the lost communication from the one of the plurality of base stations.

11. The wireless switching system of claim 10 wherein the means for recording the occurrence of the lost communication comprises storing with the recorded occurrence of the lost communication an identity of the second available one of the plurality of base stations by the system controller.

12. The wireless switching system of claim 11 further comprises means for determining a second amount of time that occurred between the loss of communication and registration on the second available one of the plurality of base stations;

the means for transmitting the other message comprises means for including the second amount of time in the other message; and the means for storing further stores the second amount of time with the recorded occurrence of the lost communication.

* * * * *